No. 890,099. PATENTED JUNE 9, 1908.
H. RICHARDSON.
CARBURETER.
APPLICATION FILED MAR. 16, 1907.
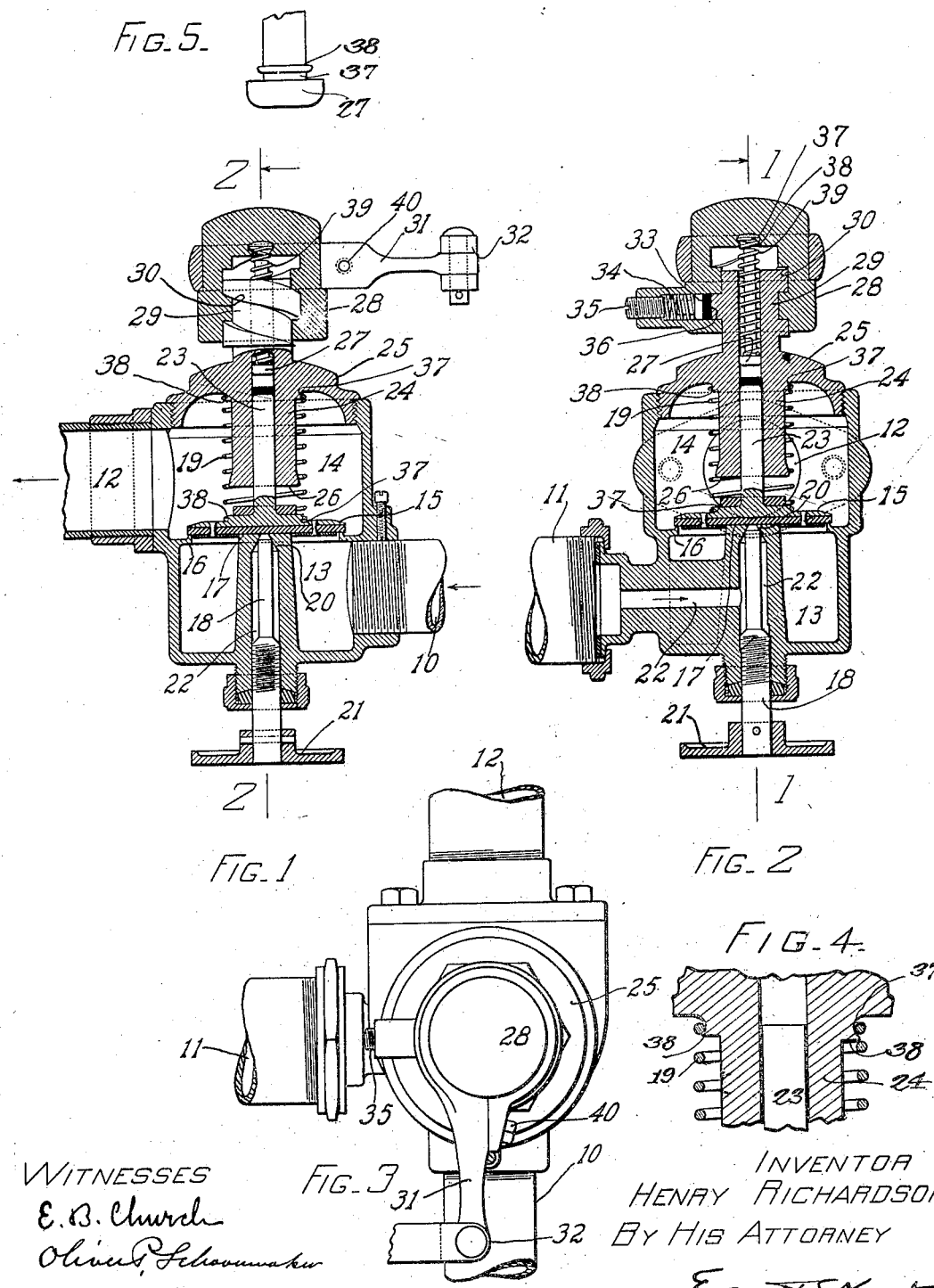
WITNESSES
E. B. Church
Oliver P. Schoonmaker
INVENTOR
HENRY RICHARDSON
BY HIS ATTORNEY
Everett E. Kent

UNITED STATES PATENT OFFICE.

HENRY RICHARDSON, OF WALTHAM, MASSACHUSETTS.

CARBURETER.

No. 890,099.

Specification of Letters Patent.

Patented June 9, 1908.

Application filed March 16, 1907. Serial No. 362,719.

*To all whom it may concern:*

Be it known that I, HENRY RICHARDSON, of Waltham, in the county of Middlesex and State of Massachusetts, have invented certain new and useful Improvements in Carbureters, of which the following is a specification.

This invention relates to carbureters.

More particularly, it relates to apparatus for mixing air with gasolene, alcohol or other hydrocarbon, for combustion within an engine; for controlling the proportions thereof and for conveniently regulating the amount of the mixture admitted to the engine.

It comprises improvements in the construction of such apparatus, as hereinafter described, reference being had to the accompanying drawings, in which Figure 1 is an elevation of apparatus embodying the invention, sectioned on the plane 1—1 of Fig. 2, looking in the direction of the arrows; and Fig. 2 is an elevation of the same apparatus, sectioned on the plane 2—2 of Fig. 1 looking in the direction of the arrows. Fig. 3 is a plan of the same, arranged like Fig. 2. Fig. 4 is an enlarged elevation of a detail. Fig. 5 is an enlarged elevation showing an arrangement of certain other parts.

Referring to the drawings: 10 is an air inlet pipe, 11 is an inlet pipe for the gasolene or other hydrocarbon, and 12 is a passage leading from the apparatus to the combustion chamber. Within the apparatus is a chamber divided into two portions 13 and 14, separated by a valve 15 which is normally held against its seat by a spring 19. This valve has an external annular seat 16 and an internal annular seat 17, within which is a needle-valve of any suitable design and here represented by the screw-mounted needle 18, the end of which is conical and adapted to fit a conical seat 20. This valve may be adjusted to any desired degree of opening by the external handle 21. Gasolene entering through pipe 11 passes through passage 22 to the needle valve. When valve 15 is closed air cannot escape from the portion 13 of the chamber, nor can gasolene escape from the passage 22; but when the suction of the engine, or other cause, raises valve 15 from its seat air and gasolene both are drawn through into chamber 14 and thence out through 12 to the engine. The stem 23 of valve 15 is guided in a central hole through a projection 24 from the cap 25 closing the upper part 14 of the chamber. The end 26 of this projection 24 constitutes a stop limiting the upward movement of the valve 15; but a readily adjustable auxiliary stop 27 is provided mounted on an auxiliary cap 28, which closes the central bore through cap 25 in which valve stem 23 plays.

One feature of the invention relates to this stop 27 and its connected parts. The cap 25 has an axial external projection 29 on which is a helical cam 30 projecting radially therefrom. The auxiliary cap 28 is supported thereon and is adjusted toward and from the apparatus by adjusting its position on this cam, which may be done by means of lever 31 which may be connected at 32 to a control arm located at any place convenient to the operator of the engine. The auxiliary cap is maintained fixedly in whatever position it may be adjusted to by a friction block 33, pressed by a spring 34 with an intensity of pressure adjustable by screw 35 against a side surface 36 of the cam or by some other surface of the projection 29. By this arrangement the stop 27 is placed in any desired position by the operator by means of control arm 31, and wherever placed it limits the degree of opening of valve 15, thus controlling the amount of mixed hydrocarbon and air which can pass through said valve during the period of time the valve remains open. The cam is arranged at such a pitch that the entire movement of the cap between the extreme outward position of the stop 27 and its extreme inward position in which it is seated against the top end of valve stem 23, holding the valve closed, occupies an arc of about one hundred and twenty degrees, so that this entire adjustment is effected by pushing the arm 31 forward or back without the need of rotary connections or gearing.

Another feature of the invention relates to the means of fastening the spring-mounted parts in place. The spring 19 is attached to the valve at one end and the cap 25 at the other end by having its final coil embedded in grooves 37, formed annularly in the part to which the spring is attached. In each case there is a lip 38 which retains the spring; but which the spring can pass over, by bending elastically when pushed or pulled with sufficient force. In the case of spring 19 this holds the valve elastically attached to cap 25 and readily removable therefrom. A similar fastening may be used with spring 39, attaching the auxiliary stop 27 elastically to the auxiliary cap 28. The form of the stop 27 when prepared for attachment to the spring is illustrated in Fig. 5, where the groove 37 is seen between the head 27 and the retaining lip 38.

In operation the arm 31 may be fastened by a clamping screw 40 upon the exterior of the auxiliary cap 28. As the cam 30 has upper and lower faces each engaging the cap 28, movement of lever 31, either forward or back, adjusts this cap up or down, moving the stop 27 correspondingly with respect to the main valve seat, and thus adjusting the degree to which valve 15 opens.

I claim:

1. In a carbureter the combination of an automatically closing valve and an elastically mounted adjustable stop therefor, limiting the opening of the valve, said stop being at a distance from the closed position and engaging the valve only when the valve is open.

2. In a carbureter, in combination, a valve adapted to close downward; a relatively weak spring pressing it constantly toward its closed position; and a relatively strong spring acting in the same direction and normally disengaged, positioned to engage it at the desired limit of its upward travel.

3. In a carbureter, in combination, a valve adapted to close downward; a spring suspended above it, normally not engaged with it; and an element from which the spring is suspended, adjustable on the carbureter to varying distances from the closed position of the valve.

4. In a carbureter, in combination, a valve adapted to close downward; the upper part of the carbureter having externally a helical cam of steep pitch and internally a hollow axial space; a cap fitting externally thereon closing the hollow space, and engaging the cam; and a spring depending from the cap into said hollow, in position to engage, and limit the lift of, the valve.

5. In a carbureter, in combination, a valve adapted to close downward; a helical spring depending above it, limiting its opening; and a buffer held by the spring at its lower end; there being in the part joined to the spring a circular groove which the final convolution of the spring fits elastically, thereby holding said part and the spring together detachably.

In testimony whereof I hereto affix my signature, in presence of two witnesses.

HENRY RICHARDSON.

Witnesses:
EVERETT E. KENT,
M. E. MURPHY.